US008756334B2

(12) United States Patent
Ozawa et al.

(10) Patent No.: US 8,756,334 B2
(45) Date of Patent: Jun. 17, 2014

(54) MOVING IMAGE REPRODUCING APPARATUS AND METHOD

(75) Inventors: Takeshi Ozawa, Kawasaki (JP); Toru Suneya, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 1048 days.

(21) Appl. No.: 11/734,340

(22) Filed: Apr. 12, 2007

(65) Prior Publication Data
US 2007/0261092 A1 Nov. 8, 2007

(30) Foreign Application Priority Data

Apr. 20, 2006 (JP) ................................. 2006-117189

(51) Int. Cl.
G06F 15/16 (2006.01)
G06F 15/167 (2006.01)
H04N 7/173 (2011.01)
H04N 11/02 (2006.01)

(52) U.S. Cl.
USPC ........... 709/231; 709/216; 709/219; 709/235; 725/86; 725/91; 725/96; 725/100; 375/240.01

(58) Field of Classification Search
USPC ............. 725/115, 116, 117, 93, 91, 103, 138, 725/144, 82, 86, 96, 100; 709/213, 709/216–219, 223, 225, 230, 231, 235; 375/240.01
See application file for complete search history.

(56) References Cited

U.S. PATENT DOCUMENTS

| 7,529,806 B1* | 5/2009 | Shteyn ........................... 709/217 |
| 7,903,947 B2* | 3/2011 | Yamada et al. ................ 386/326 |
| 8,046,338 B2* | 10/2011 | Basso et al. .................... 707/687 |
| 8,156,176 B2* | 4/2012 | Lerman et al. ................ 709/203 |
| 2001/0003195 A1* | 6/2001 | Kajimoto ....................... 709/310 |
| 2003/0055971 A1 | 3/2003 | Menon |
| 2003/0079222 A1* | 4/2003 | Boykin et al. .................... 725/31 |
| 2004/0146285 A1* | 7/2004 | Matsui et al. ..................... 386/98 |
| 2004/0168052 A1* | 8/2004 | Clisham et al. ................. 713/153 |
| 2006/0092938 A1* | 5/2006 | Gentrix .......................... 370/390 |
| 2006/0161595 A1* | 7/2006 | Sugimoto et al. ............. 707/200 |
| 2008/0133701 A1* | 6/2008 | Kazmi et al. ................... 709/217 |
| 2008/0193103 A1* | 8/2008 | Miyamoto ....................... 386/79 |
| 2009/0228283 A1* | 9/2009 | Toma et al. .................... 704/500 |

FOREIGN PATENT DOCUMENTS

| JP | 2002-032259 A | 1/2002 |
| JP | 2004-080145 | 3/2004 |
| JP | 2004-120376 A | 4/2004 |
| JP | 2005-151484 A | 6/2005 |
| WO | 2005/076608 A1 | 8/2005 |

OTHER PUBLICATIONS

Chinese Office Action dated Mar. 15, 2010.

* cited by examiner

*Primary Examiner* — Hoang-Vu A Nguyen-Ba
(74) *Attorney, Agent, or Firm* — Carter, DeLuca, Farrell & Schmidt, LLP

(57) ABSTRACT

A moving image reproducing apparatus which receives moving image data transmitted through a network and reproduces the moving image data includes an analysis unit adapted to analyze first moving image data stored in a storage unit and additional information of the first moving image data, a determination unit adapted to determine a storage destination on the network which is configured to acquire second moving image data following the first moving image data on the basis of the analysis result on the additional information, an acquisition unit adapted to acquire the second moving image data from the storage destination of the second moving image data, and a reproducing unit adapted to reproduce the second moving image data acquired by the acquisition unit concurrently with finishing reproduction of the first moving image data.

16 Claims, 12 Drawing Sheets

FIG. 3

```
aligned (8) class DataReferenceBox      /* ISO STANDARD BOX */
    extends FullBox ('dref', version=0, 0) {
    unsigned int (32) entry_count;          ~-308
    for (i=1 ; i <entry_count ; i++) {
        DataEntryBox (entry_version, entry_flags)data_entry ;
    }
}
                            302
aligned (8) class DataEntryUrlBox       /* ISO STANDARD BOX */
    extends FullBox ('url', version=0, flags) {
    string          location;
}
                            303
aligned (8) class DataEntryUrlBox2      /* BOX UNIQUE TO EMBODIMENT */
    extends FullBox ('url2', version=0, 0) {
    unsigned int (32) entry_count;          ~-304
    for (i=1 ; i <entry_count ; i++) {
        unsigned int   duration;            ~-305
        int            offset_delta;        ~-307
        string         location;            ~-306
    }
}
```

301

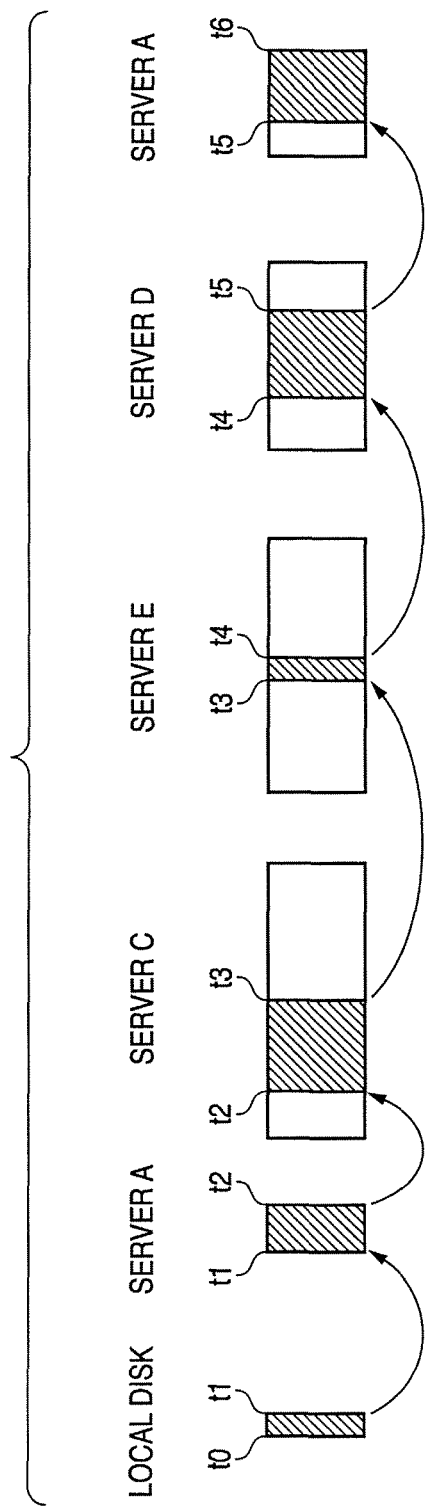

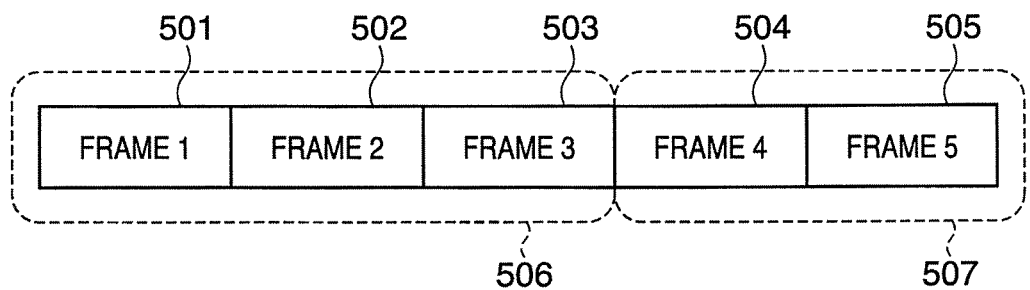
F I G. 5C

FIG. 6

| | | |
|---|---|---|
| SEQUENCE 1 | ENTRY 1 | file://LOCAL DISK/start.mp4 |
| | ENTRY 2 | rtsp://TRANSMISSION SERVER 1/content.mp4 |
| SEQUENCE 2 | ENTRY 1 | file://LOCAL DISK/start.mp4 |
| | ENTRY 2 | rtsp://TRANSMISSION SERVER 2/content.mp4 |
| SEQUENCE 3 | ENTRY 1 | file://LOCAL DISK/start.mp4 |
| | ENTRY 2 | rtsp://TRANSMISSION SERVER 3/content.mp4 |

FIG. 8

```
aligned (8) class MoofReferenceBox
        extends FullBox ('mref', version=0, 0) {
        unsigned int (32) entry_count;
        for (i=1 ; i <entry_count ; i++) {
                string           location;
                unsigned int size;
        }
}
```

FIG. 9

|        | URL     | SIZE      |
|--------|---------|-----------|
| moof 1 | http://~ | ***BYTES  |
| moof 2 | http://~ | ###BYTES  |
| moof 3 | http://~ | +++BYTES  |
| ⋮      |         |           |

MOVING IMAGE REPRODUCING APPARATUS AND METHOD

BACKGROUND OF THE INVENTION

1. Field of the Invention

The present invention relates to a technique of reproducing moving image data.

2. Description of the Related Art

Recently, the use of high-speed Internet connection services and wired and wireless home networks has rapidly become popular. A use method has becoming popular, which stores moving image contents converted into digital data in a home server to allow the user to view the contents on another device through a home network or receives moving image contents from a moving image distribution service on the Internet and allowing the user to view the contents. Even when a user is away from home, he/she can view moving image contents by transferring the contents to a portable reproducing device through the Internet. In order to allow a user to comfortably view these moving images, it is desired to start reproducing a moving image content immediately after the user issues a view instruction by operating the reproducing device as well as to display moving images actually reproduced and displayed with high image quality.

When downloading a moving image content on a network and reproducing it, the reproducing device starts reproducing it with a delay corresponding to the time required for data transfer with respect to when a moving image content held as a local file. In order to eliminate such a delay of the start of reproduction, a reproducing device performs streaming reproduction, i.e., storing, in the buffer of the reproducing device, moving image data in an amount that allows partial reproduction without waiting for the transfer of all the data of the moving image content, decoding the stored moving image data, and reproducing it.

Streaming reproduction makes it possible to seamlessly reproduce moving image data while hiding the time required for data transfer by decoding and reproducing partial moving image data and concurrently transferring partial moving image data to be reproduced next. In addition, even a portable reproducing device with a small storage capacity can perform streaming reproduction because it need not hold all moving image data of a large data capacity at once by using, for example, a method of discarding reproduced partial moving image data at proper timing.

As a conventional technique associated with streaming reproduction, for example, the technique disclosed in Japanese Patent Laid-Open No. 2004-080145 is available.

With regard to the first part of a moving image content to be started to be reproduced, however, reproduction cannot hide the time required for data transfer, and hence there is still a wait time between the instant at which the user issues a reproduction instruction and the instant at which reproduction starts.

The data transfer time greatly depends on the data transfer rate of a network to be used, an encoding scheme for a moving image content to be transferred, and a code amount per unit time. Recently, with the proliferation of high-speed Internet and high-speed wireless communication schemes, the data transfer rate has increased year by year. At the same time, however, the resolution and data transfer rate of moving image contents to be viewed have increased. In addition, the number of users has increased. Increases in resolution and transfer rate will cause not only increases in the congestion of the network and server load but also increases in the amount of transfer data stored until the start of reproduction. In addition, an increase in the number of users will increase the congestion of the network and the processing load on servers.

An increase in the speed of a network therefore is effective only in a use condition where the use of the network can be widely ensured, and hence provides no method of solving problems associated with the transfer and reproduction of the moving image data of moving image contents.

The present invention has been made in consideration of the problems in the prior art, and has as its object to provide a video reproduction technique which can shorten the time required for the start of reproduction of moving image data.

SUMMARY OF THE INVENTION

Embodiments of the present invention are provided to overcome the above-described drawbacks of the related technology.

According to an aspect of the present invention, an embodiment is directed to a moving image reproducing apparatus which reproduces a moving image based on moving image data, comprising:

a data storage unit adapted to store first moving image data in advance;

a determination unit adapted to determine a storage destination on a network of second moving image data following the first moving image data based on the additional information of the first moving image data;

a reproducing unit adapted to reproduce a moving image based on the first moving image data; and an acquisition unit adapted to start to acquire the second moving image data from the storage destination of the second moving image data determined by the determination unit, during reproducing the moving image based on the first moving image data, and wherein the reproducing unit reproduces moving image based on the second moving image data acquired by the acquisition unit after finishing reproduction of the first moving image data.

According to another aspect of the present invention, an embodiment is directed to a moving image reproducing method which reproduces a moving image based on the moving image data, comprising:

a storage step of storing first moving image data in advance;

a determination step of determining a storage destination on a network of second moving image data following the first moving image data based on the additional information of first moving image data;

a reproducing step of reproducing a moving image based on the first moving image data an acquisition step of starting to acquire the second moving image data from the storage destination of the second moving image data which is determined in the determination step, during reproducing the moving image based on the first moving image data, and wherein moving image based on the second moving image data is reproduced after finishing reproduction of the first moving image data in the reproducing step.

The present invention can shorten the time required for the start of reproduction of moving image data.

Further features of the present invention will become apparent from the following description of exemplary embodiments (with reference to the attached drawings).

BRIEF DESCRIPTION OF THE DRAWINGS

FIG. 3 is a view for explaining Data Reference Box of an MP4 file;

FIG. 5A is a view exemplifying access (connection) to content data in each server upon switching of connection destinations of content data;

FIG. 5C is a view exemplifying the arrangement of data which the reproducing apparatus acquires from the transmission server apparatus;

FIG. 6 is a view exemplifying the storage location of data which is set for each of a plurality of sequences;

FIG. 8 is a view for explaining "MoofReferenceBox" (mref);

FIG. 9 is a view exemplifying the data structure based on "MoofReferenceBox" (mref)

DESCRIPTION OF THE EMBODIMENTS

First Embodiment

Figure 1:
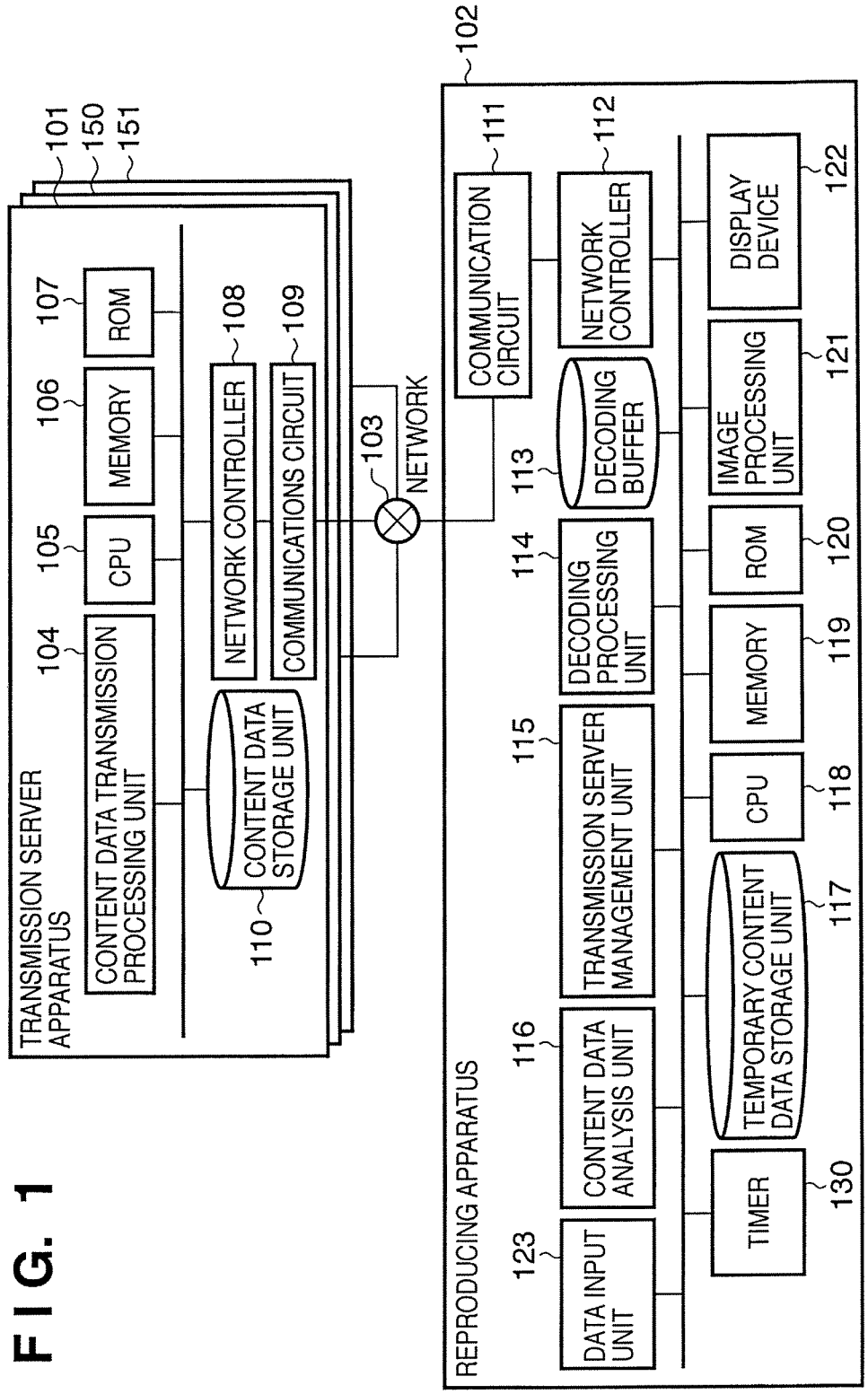
FIG. 1 is a view showing the arrangement of a preferred moving image content transmission/reception system according to the first embodiment of the present invention.

An embodiment of the present invention will be described below with reference to the accompanying drawings. FIG. 1 is a view showing the arrangement of a preferred moving image content transmission/reception system according to the first embodiment of the present invention. As shown in FIG. 1, a moving image content transmission/reception system includes transmission server apparatuses 101, 150, and 151, a reproducing apparatus 102 which reproduces moving images, and a network 103 which connect them through a communications line. As communication protocols for the network 103, HTTP (Hyper Text Transfer Protocol) and RTP (Real-time Transport Protocol) are available.

A temporary content data storage unit 117 of the reproducing apparatus 102 stores moving image content data (to be also simply referred to as "content data" hereinafter) including video and audio data. A content data analysis unit 116 analyzes the format structure of the stored content data. The content data analysis unit 116 reads out encoded data contained in the content data on the basis of the analyzed format structure, and stores the data in a decoding buffer 113. A decoding processing unit 114 decodes the readout encoded data. An image processing unit 121 D/A-converts the decoded data. A display device 122 displays the D/A-converted data and reproduces the content data. Programs stored in a ROM 120 and the like execute these processes under the control of a CPU 118. In this case, a memory 119 provides a data storage area required for processing.

A specific procedure for data processing in the reproducing apparatus 102 will be described next. First of all, the reproducing apparatus 102 receives the data of the start portion of a moving image content through a data input unit 123 (e.g., a removable medium such as a CD-ROM or DVD-ROM connected to the data input unit 123 of the reproducing apparatus 102 not through the network 103), and stores the received data in the temporary content data storage unit 117.

The reproducing apparatus 102 may download the data of the start portion of the moving image content through a communication circuit 111 and the network 103 under the control of a network controller 112, and store the data in the temporary content data storage unit 117.

The data of the start portion stored in the temporary content data storage unit 117 is not the data of the entire moving image content but is the data of a portion. It suffices to ensure, as the storage capacity of the temporary content data storage unit 117, a storage area which can store the data of the start portion of a moving image content. For example, this embodiment of the present invention can be applied to even a portable reproducing apparatus with a small storage capacity.

Assume that the transmission server apparatus 101 or the like which can connect to the reproducing apparatus 102 stores in advance content data following the data of the start portion stored in the reproducing apparatus 102 through the network 103 such as the Internet. The data of the start portion stored in the temporary content data storage unit 117 and the content data stored in a content data storage unit 110 such as the transmission server apparatus 101 can constitute an entire moving image content.

Assume that the data of the start portion of the moving image content stored in the temporary content data storage unit 117 contains at least one piece of storage information (e.g., URL information) indicating the storage location of the content data following the data of the start portion. The content data analysis unit 116 can analyze storage information and specify the storage location of content data following the data of the start portion. Assume that if content data contains a plurality of pieces of storage information, a plurality of storage locations can be specified. The network controller 112 evaluates a communication environment between the reproducing apparatus 102 and each storage location specified by the content data analysis unit 116. For example, the network controller 112 selects a connection destination (a communication sequence with the highest download speed (communication speed)) determined as optimal for reproduction by evaluating a communication speed, communication stability, or the like.

When the decoding processing unit 114 of the reproducing apparatus 102 starts reproduction processing of the data of the start portion, the network controller 112 acquires (downloads) content data following the data of the start portion on the basis of the connection destination selection result. The network controller 112 acquires the content data concurrently with reproduction processing of the data of the start portion. This prevents the time required for the acquisition of content data following the data of the start portion from becoming evident as a wait time. That is, this can eliminate any delay time, i.e., the time during which the user waits for the acquisition of content data, at the time of reproducing of content data.

A reproducing procedure for a moving image content will be described next. ISO Base Media File Format (ISO/IEC 14496 Part12) will be described as an example of a file format suitable for the embodiment of the present invention. ISO Base Media File Format is generally called an MP4 file because of its extension, and hence will be called a file in this format as an "MP4 file" hereinafter for the sake of simplicity.

Figure 2:
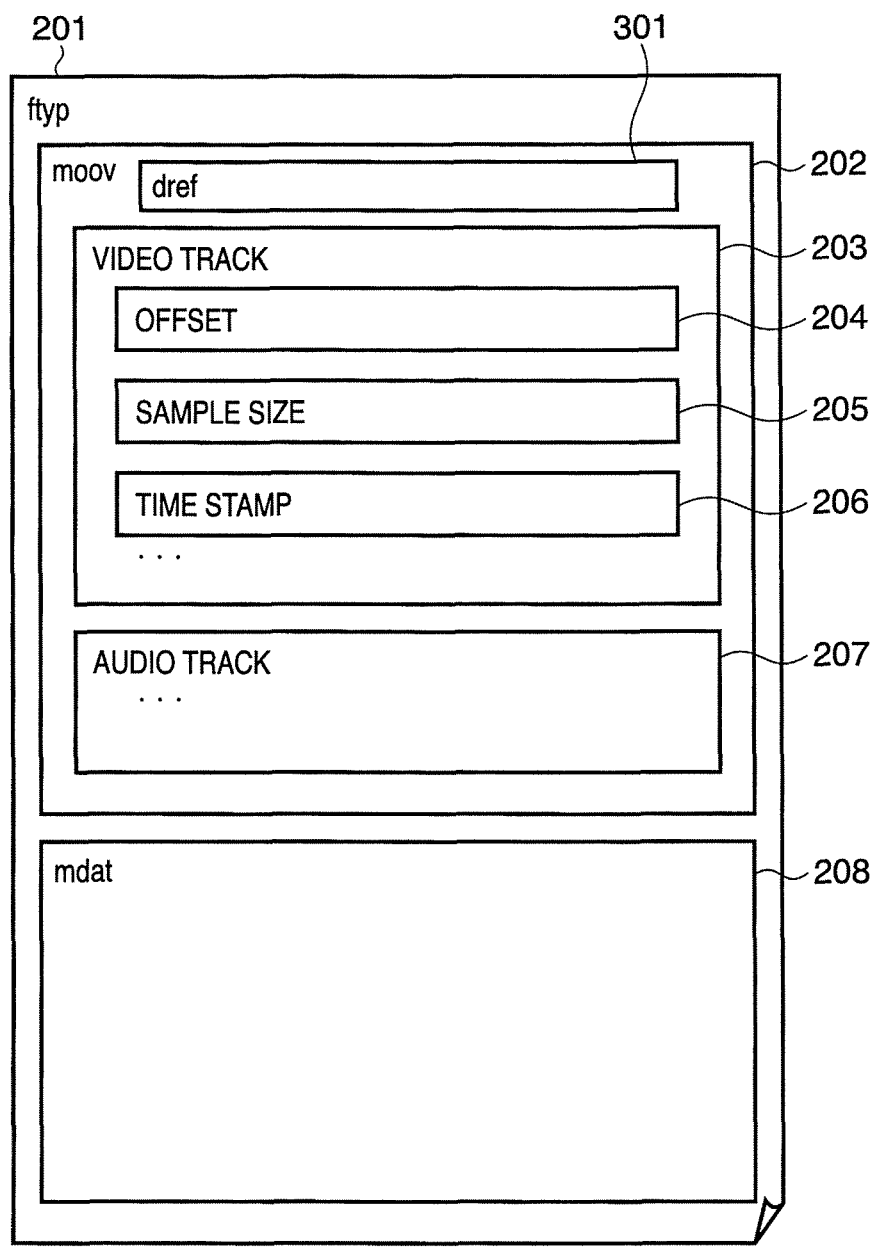
FIG. 2 is a view for explaining the arrangement of an MP4 file.

An MP4 file (ftyp) generally has a data structure like that denoted by reference numeral 201 in FIG. 2. This structure roughly comprises a content data portion (mdat) 208 storing encoded data and a header portion (moov) 202 storing so-called meta data such as time information and position information attached to the encoded data. The header portion 202 further contains, for example, storage information indicating the storage location of content data following the data of the start portion.

Assume that in this embodiment, the temporary content data storage unit 117 stores in advance all meta data smaller in size than encoded content data, together with the content data of the start portion of the moving image content.

In normal reproduction processing of an MP4 file, the content data analysis unit 116 refers to information indicating the storage location of the content data stored in the meta data of the header portion 202. The content data analysis unit 116 further writes encoded data in the decoding buffer 113 prepared for decoding on the basis of the offset information of data at the connection destination or the size information of actually readout individual encoded data.

In this embodiment, the temporary content data storage unit 117 which can read out data without any large time lag stores the content data of the start portion of the content data portion 208. Analyzing the storage information contained in meta data by using the content data analysis unit 116 makes it possible to specify the storage destination of the encoded data of a moving image content following the content data of the start portion. Specifying that the content data storage unit 110 of the transmission server apparatus 101 stores content data allows the reproducing apparatus 102 to acquire content data following the data of the start portion from the transmission server apparatus 101.

If there are a plurality of pieces of storage information indicating the storage locations of content data following the data of the start portion, the reproducing apparatus 102 can select one of the storage locations and acquire content data therefrom. Assume that identical content data are stored at the storage locations specified by the respective pieces of URL information. The reproducing apparatus 102 can select from which storage location to acquire content data in accordance with a communication environment between the reproducing apparatus 102 and the transmission server apparatus specified by each URL. In this case, the reproducing apparatus 102 considers, as a communication environment, a communication load on the network 103, connection/non-connection to each transmission server apparatus, whether each transmission server apparatus is operating, and the like. If, for example, the reproducing apparatus 102 cannot communicate with the transmission server apparatus 101, the reproducing apparatus 102 can acquire succeeding content data by communicating with the transmission server apparatus 150 or 151. In addition, the reproducing apparatus 102 can select one of the transmission server apparatuses 101, 150, and 151 which requires the least time for the transmission of content data in consideration of a communication load.

When connecting to the transmission server apparatus 101 or the like, the reproducing apparatus 102 can acquire content data from the transmission server apparatus which is determined as optimal in accordance with a communication speed to the connection destination specified by each URL, communication stability, and the like. Assume that the reproducing apparatus 102 can dynamically change the acquisition destination of content data while determining a communication load (a communication speed, communication stability, and the like). For example, the reproducing apparatus 102 can determine a connection destination exhibiting the highest download speed for content data as an optimal connection destination. Selection of a connection destination by the reproducing apparatus 102 will be described in detail later with reference to FIG. 10, and hence a detailed description thereof will be omitted here.

A mechanism of designating a storage location for encoded data (content data) will be described next with reference to FIG. 2 which is a conceptual view of an MP4 file format. In the MP4 file format, data to be recorded in a file is described by the data structure called "BOX", and each information is recorded in the file 201 on a BOX basis. The presentation of the overall content is called "movie", and the presentation of media streams constituting the content is called "track". The header portion (moov) 202 contains a video track 203 which logically handles the overall video/audio data, and an audio track 207 which logically handles the overall audio data. The video track 203 basically has almost the same constituent contents as those of the audio track 207.

The data contained in the video track 203 includes, for example, the constituent information of a decoder for decoding the encoded data (content data) of the content data portion (mdat) 208 and information such as the rectangular size of a moving image. This data also includes a sample size 205 indicating the size of each frame data (which is sometimes called a sample or a picture in the case of video data) of the content data and a decode time for each frame data. As the data contained in the video track 203, a time stamp 206 indicating a presentation time, an offset 204 indicating a position on the file, and the like are recorded. A BOX called "Data Reference Box" (dref) 301 in the header portion (moov) 202 stores storage information indicating the storage location of the content data. FIG. 3 exemplifies the description of this information. When indicating URL information, "DataEntryBox" in "Data Reference Box" is described in the form of "DataEntryUrlBox" 302. The MP4 file format allows to register the storage locations of a plurality of data in "DataEntryUrlBox" 302, but can indicate only one content data to be reproduced at the same time.

For this reason, extending "DataEntryUrlBox" 302 to, for example, "DataEntryUrlBox2" 303 allows to describe content data which can be reproduced at the same time by using pieces of information (sequences) indicating a plurality of data storage locations. The number of elements (entries) indicating how many data storage locations are registered is set for each sequence by using "entry_count" 304 in "DataEntryUrlBox" 302. This embodiment sets connection duration information "duration" 305 indicating the duration (time) during which the reproducing apparatus 102 connects to the storage destination of content data for each entry and connection destination information "location" 306 indicating the connection destination of the content data. The embodiment further sets connection position correction information "offset_delta" 307 which corrects the absolute position of the storage destination of content data to which the reproducing apparatus 102 connects by changing the connection destination information "location" 306. In addition, entry_count 308 of "Data Reference Box" represents the total number of sequences, and "DataEntryUrlBox2" 303 corresponding to the total number is described.

When performing reproduction processing, the reproducing apparatus 102 can connect to the storage destination of content data of an arbitrary one of the sequences of content data indicated by entry_count 308 of "Data Reference Box" 301. The reproducing apparatus 102 can acquire the same content data regardless of from which sequence the apparatus connects to the storage location of data. If the connection destination information "location" 306 changes in accordance with the connection duration information "duration" 305, the reproducing apparatus 102 can acquire content data from a sequence (the transmission server apparatus 101 or the like) under a better condition in accordance with the communication environment or the like of the network. The MP4 file format, a value called "time scale" expressing a time as the minimum unit obtained by dividing one sec by some value in each of "movie" and "track". For example, if the time scale is 1,000, the time represented by the time scale is the ms unit. The connection duration information "duration" 305 in FIG. 3 is information indicating the duration (time) during which the reproducing apparatus 102 connects to the storage location of data for each entry. Even expressing this information by the time scale in either "movie" or "track" allows to obtain the same effect.

A case wherein there are plurality of sequences in "DataEntryUrlBox2" in FIG. 3, and the connection destination information "location" 306 of each sequence changes for each arbitrary connection duration information "duration" 305 will be described next with reference to FIG. 4.

Figure 4:
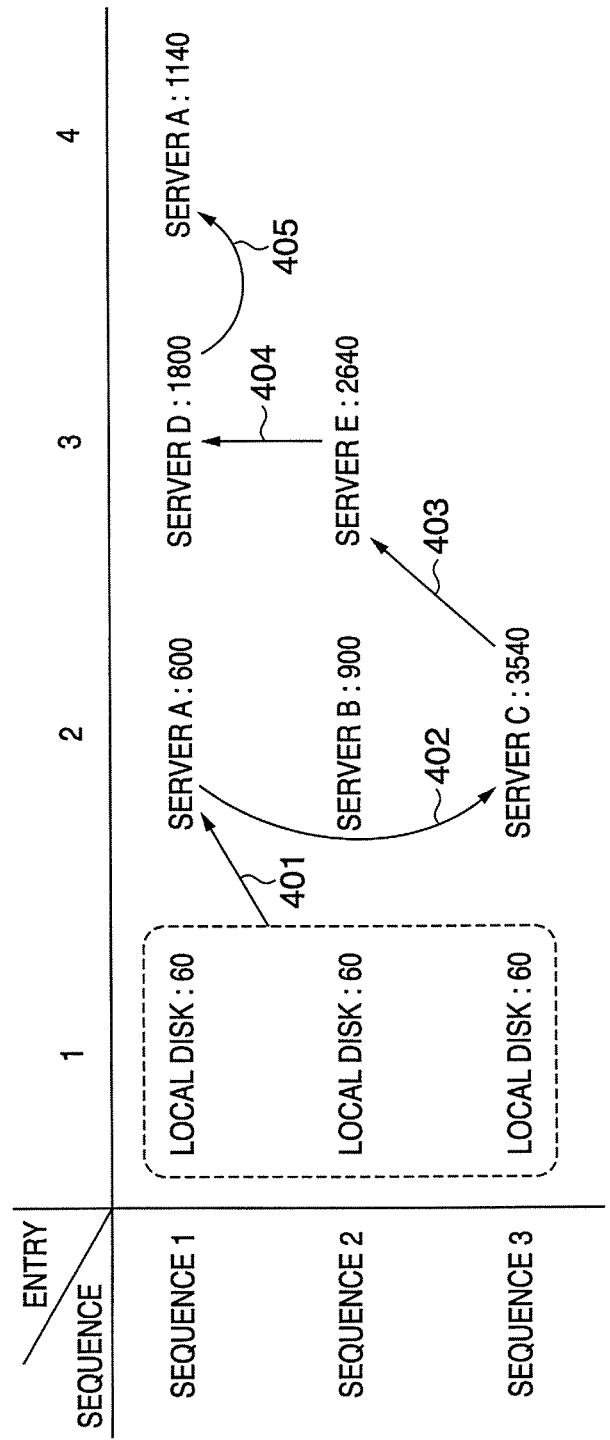
FIG. 4 is a view for explaining a connection sequence for content data.

Referring to FIG. 4, there are three sequences of information indicating the storage locations of content data. Sequence 1 includes four entries, i.e., local disk, transmission server apparatus (to be simply referred to as a "server" hereinafter) A, server D, and server A. Sequence 2 includes three entries, i.e., local disk, server, and server E. Sequence 3 includes two entries, i.e., local disk and server C. In each sequence, the first entry indicates the same URL indicating a local disk (temporary content data storage unit 117). Assume that the data (e.g., "server A: 600") entered in each sequence indicates connection destination information "location" and connection duration information "duration". For the sake of simplification, the connection position correction information "offset_delta" 307 is omitted, and the time scale is set to "1".

In the case of sequence 3 in FIG. 4, the connection duration with respect to server C is "3,540 (sec)". In sequence 2, a connection duration of 3,540 (sec) is distributed into "900 (sec)" in server B and "2,640 (sec)" in server E. In sequence 1, a connection duration of 3,540 (sec) is distributed into "600 (sec)" in server A, "1,800 (sec)" in server D, and "1,140 (sec)" in server A.

In the case shown in FIG. 4, the connection destinations of content data are switched like server A, server C, server E, server D, and server A as indicated by arrows 401 to 405 from the local disk entered first.

FIG. 5A exemplifies access (connection) to content data in each server upon switching of the connection designations of content data. Referring to FIG. 5A, each hatched portion indicates a portion where the reproducing apparatus 102 connects to the content data stored in a corresponding transmission server apparatus.

After the reproducing apparatus 102 connects to the data stored on the local disk for the time interval from t0 to t1 (sec), the connection destination is switched to server A (the connection duration is from t1 to t2 (sec)). The network controller 112 of the reproducing apparatus 102 requests server A for the transmission of content data starting from t1, and downloads (acquires) content between time t1 and time t2 (sec). The connection between the reproducing apparatus 102 and server A is switched in accordance with the communication environment between the reproducing apparatus 102 and server A. Since specific processing of switching connection destinations will be described in detail later with reference to FIG. 10, a description thereof will be omitted here.

The network controller 112 connects to server C to request the transmission of content data starting from time t2, and acquires content data (from time t2 to time t3) following end time t2 of the content acquired from server A. The network controller 112 connects to server E to request the transmission of content data starting from time t3, and acquires content data (from time t3 to time t4) following end time t3 of the content acquired from server C. The network controller 112 then connects to server D to request the transmission of content data starting from time t4, and acquires content data (from time t4 to time t5) following end time t4 of the content acquired from server E. The network controller 112 connects to server A to request the transmission of content data starting from time t5, and acquires content data (from time t5 to time t6) following end time t5 of the content acquired from server D, thus terminating the acquisition of the data of the entire content.

The decoding processing unit 114 decodes and reproduces the content data which the network controller 112 of the reproducing apparatus 102 has acquired.

Figure 5B:
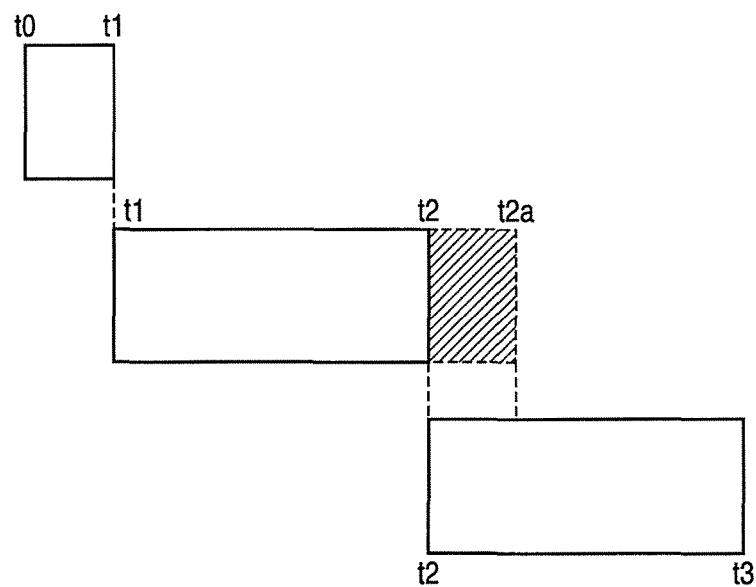
FIG. 5B is a view for explaining the acquisition of partially overlapping data which a reproducing apparatus acquires from a transmission server apparatus.

In the case shown in FIG. 5A, the network controller 112 acquires data at consecutive reproduction times from the respective servers. However, the network controller 112 can acquire partially overlapping data as indicated by the portion between time t2 and time t2a shown in FIG. 5B. Acquiring partially overlapping data makes it possible to continuously perform reproduction without any interruption even if data transmission occurs due to variations in the communication environment in the network 103.

In the case shown in FIG. 5A, in order ensure continuity between acquired data, the end time of reproduction is matched with the start time of reproduction. However, the gist of the present invention is not limited to this example. For example, as shown in FIG. 5C, if content data comprises a plurality of frames 501 to 505, it suffices to specify data acquired on a frame basis. If content data comprises blocks 506 and 507 as aggregates of frames, the network controller 112 of the reproducing apparatus 102 can request data to be acquired on a block basis. When, for example, the network controller 112 of the reproducing apparatus 102 requests the block 506, the transmission server apparatus sequentially transmits the content data of frames 1, 2, and 3 contained in the block 506. When the network controller 112 further requests the block 507 following the block 506, the transmission server apparatus transmits frames 4 and 5 contained in the block 507 to the reproducing apparatus 102 side, and the reproducing apparatus 102 reproduces the content data of frame 4 following frame 3, thereby ensuring the continuity of reproduction processing.

If there are a plurality of transmission server apparatuses A to E which can supply the same content data, the reproducing apparatus 102 monitors a communication environment with respect to each transmission server apparatus. The reproducing apparatus 102 can acquire content data by switching the current transmission server apparatus to another transmission server apparatus exhibiting an optimal communication environment, as needed. The network controller 112 of the reproducing apparatus 102 controls communication with the transmission server apparatus 101. The reproducing apparatus 102 can communicate control codes and the like required for communication control with each of transmission server apparatus A to E and the like as well as acquiring content data through the communication circuit 111 and the network 103. A transmission server management unit 115 of the reproducing apparatus 102 manages a communication environment with respect to each of transmission server apparatuses A to E and the like. The network controller 112 acquires content data upon switching the current transmission server apparatus to another transmission server apparatus exhibiting an optimal communication environment in accordance with the communication environment management result obtained by the transmission server management unit 115. That is, the transmission server management unit 115 manages storage information (including a plurality of pieces of URL information) read from the data stored first in the temporary content data storage unit 117 of the reproducing apparatus 102. The transmission server management unit 115 acquires a change in communication environment with respect to each transmission server apparatus through the communication circuit 111 controlled by the network controller 112. The transmission server management unit 115 manages data indicating changes in communication environment, and the network controller 112 acquires content data upon switching the current transmission server apparatus to another transmission server apparatus exhibiting a good communication environment.

Note that when switching transmission server apparatuses, the network controller 112 can acquire encoded data used by the decoding processing unit 114 by look-ahead processing so as to prevent the occurrence of a delay (pause) in a video at the time of switching.

Reference numeral 101 in FIG. 1 denotes the arrangement of the transmission server apparatus 101 according to this embodiment. The transmission server apparatus 101 connects to the network 103 through a communications circuit 109 controlled by a network controller 108. A content data transmission processing unit 104 generates data to be transmitted from the content data stored in the content data storage unit 110 in accordance with a request from the reproducing apparatus 102, and transmits the data to the reproducing apparatus 102.

The transmission server apparatus executes processing in accordance with a control program (firmware) stored in a ROM 107 under the overall control of a CPU 105. A memory 106 provides a memory necessary for processing in the transmission server apparatus, as needed.

Figure 10:
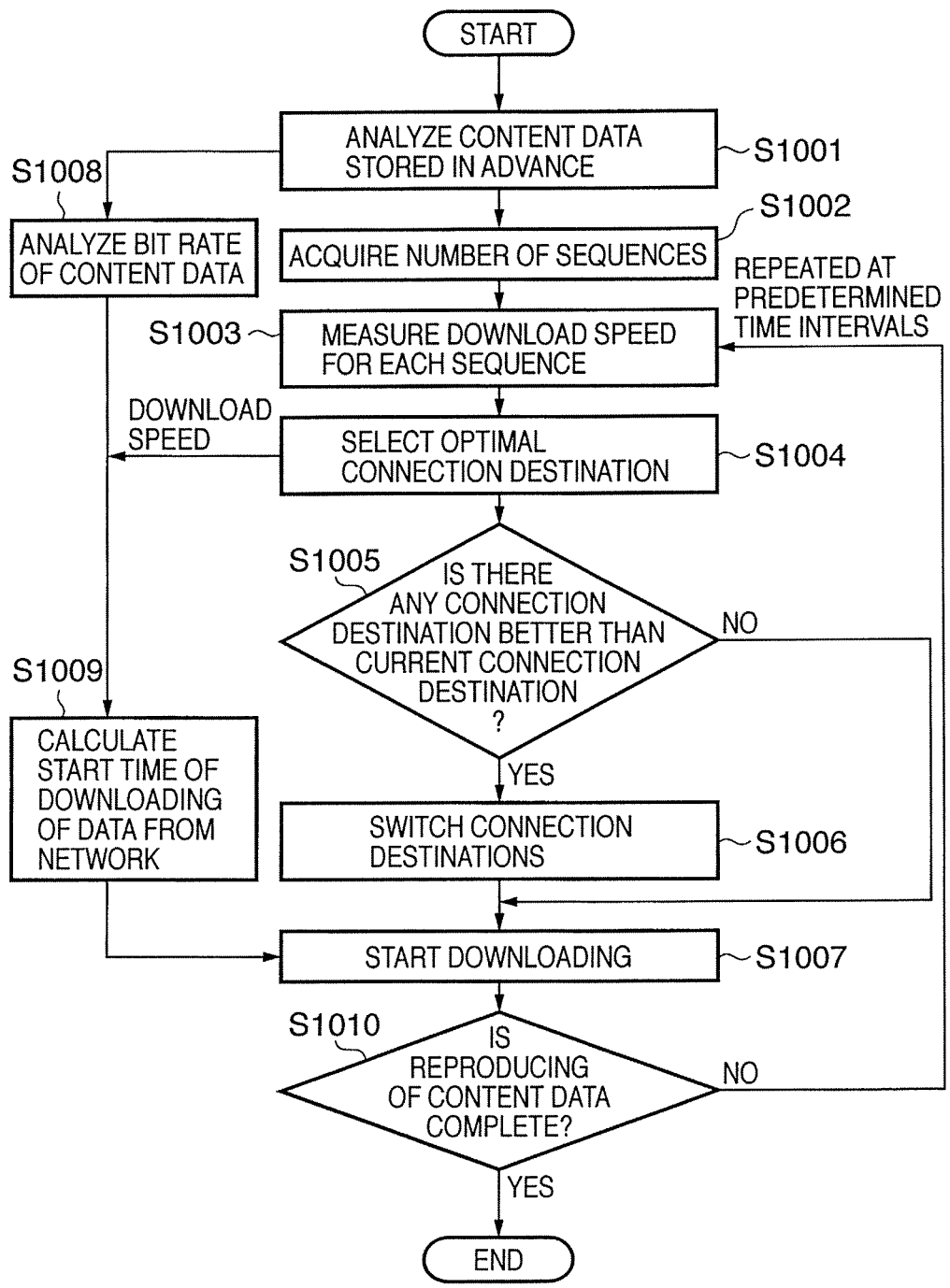
FIG. 10 is a view for explaining an overall processing procedure in a case wherein the reproducing apparatus according to this embodiment of the present invention reproduces content data.

An overall processing procedure to be executed when the reproducing apparatus according to this embodiment reproduces content data will be described next with reference to the flowchart of FIG. 10.

When starting reproduction processing, the content data analysis unit 116 of the reproducing apparatus 102 analyzes the content data stored in advance in the temporary content data storage unit 117 in step S1001.

In step S1008, the content data analysis unit 116 analyzes the bit rate of content data to be reproduced.

In step S1002, the content data analysis unit 116 acquires the number of sequences of storage information indicating the storage destinations of content data described in the header portion 202. For example, in the case shown in FIG. 4, the content data analysis unit 116 acquires "3" as the number of sequences.

In step S1003, the network controller 112 measures the download speed of each sequence acquired by the content data analysis unit 116. In this case, the network controller 112 can measure a download speed between the reproducing apparatus 102 and each transmission server apparatus on the basis of the communication environment between the reproducing apparatus 102 and each of transmission server apparatuses A to E and the like which is specified by each sequence of storage information.

In step S1004, the network controller 112 selects a connection destination determined as having an optimal download speed for reproducing (a communication sequence with the highest download speed (communication speed)) of the measured download speeds. In step S1005, the network controller 112 determines whether the connection destination selected in step S1004 allows downloading of data at a download speed higher than that of the currently set connection destination. If this determination result indicates that there is a connection destination exhibiting a download speed higher than the current setting (Yes in step S1005), the process advances to step S1006, in which the network controller 112 controls the communication circuit 111 to switch the current connection destination.

If it is determined in step S1005 that there is no connection destination exhibiting a download speed higher than the current setting (No in step S1005), the process advances to step S1007 to start downloading content data at the current connection destination setting during reproducing moving image based on content data stored in the temporary content data storage unit 117. After reproducing moving image based on content data stored in the temporary content data storage unit 117 is finished, the reproducing apparatus 102 starts to reproduce moving image based on the downloaded content data.

In step S1010, the decoding processing unit 114 of the reproducing apparatus 102 determines whether the reproducing apparatus 102 completes reproduction of all the content data (including not only stored content data in advance, but also downloaded content data via the network 103 following stored content data) stored in the temporary content data storage unit 117. If the reproducing apparatus 102 completes reproduction of all the content data (Yes in step S1010), the process comes to an end. If the reproducing apparatus 102 performs halfway through reproduction, i.e., has not completed reproduction of all the content data (No in step S1010), the process returns to step S1003.

In step S1003, the network controller 112 measures a download speed for each sequence again. In step S1004, the network controller 112 selects a connection destination exhibiting the highest download speed (communication speed) of the download speeds measured again.

In step S1005, the network controller 112 determines again whether the connection destination selected in step S1004 allows downloading of data at a download speed higher than that of the currently set connection destination. If this determination result indicates that there is a connection destination exhibiting a download speed higher than the current setting (Yes in step S1005), the process advances to step S1006, in which the network controller 112 controls the communication circuit 111 to switch the connection destination. If it is determined in step S1005 that there is no connection destination exhibiting a download speed higher than the current setting (No in step S1005), the process advances to step S1007.

In step S1009, the CPU 118 calculates the download start time of the next content data on the basis of the download speed measured in step S1004 and the bit rate of the content data analyzed in step S1008 in advance.

The decoding processing unit 114 can manage the reproduction time of content data by using a timer 130, and requests the next content data on the basis of the progress of reproduction of the content data and the download start time. The CPU 118 determines the download start timing of the next content data on the basis of this request, and the network controller 112 requests the transmission server apparatus for the transmission of content data on the basis of this determination. When, for example, the reproduction of the content data acquired by server A ends at time t2 as shown in FIG. 5A, the network controller 112 requests server C for the transmission of continuous content data at time t2.

In accordance with a transmission request from the network controller 112 of the reproducing apparatus 102, the transmission server apparatus transmits corresponding content data to the reproducing apparatus 102.

The reproducing apparatus 102 repeats selection of a connection destination and downloading of content data until the reproduction of all the content data is complete. The reproducing apparatus 102 can repeatedly perform the processing from step S1003 to step S1010 at predetermined time intervals, thereby controlling switching of connection destinations for the acquisition of content data in accordance with a communication environment.

As described above, this embodiment can shorten the time required to start reproducing moving image data.

According to this embodiment, storing the encoded data of the start portion of content data on the local disk of the reproducing apparatus in performing reproduction processing makes it possible to start reproduction processing without any wait time for the acquisition of data.

If there are a plurality of transmission server apparatuses which can acquire encoded data, selecting a transmission server apparatus in a better communication environment and acquiring encoded data can perform stabler reproduction processing.

Even when switching the acquisition destination of data from a local disk to a transmission server apparatus or from a transmission server apparatus to another transmission server apparatus, this embodiment can perform reproduction processing without pause by performing look-ahead processing for data.

Second Embodiment

An embodiment in which a transmission server apparatus 101 transmits content data by using RTP (Real-Time Transport Protocol) will be described next. Assume that in this embodiment, the first entry in "Data Reference Box" in the first embodiment indicates the URL of a local disk, and the second entry indicates the URL of a transmission server apparatus which performs data transmission by RTP:

entry 1 . . . file://local disk/start.mp4
entry 2 . . . rtsp://*.*.*.*/###/content.mp4

In this case, first of all, the content data of the first portion is read out from "start.mp4" in a temporary content data storage unit 117. Designating, for example, "content.mp4" on the transmission server apparatus 101 makes the transmission server apparatus 101 transmit the content data following start.mp4 to a reproducing apparatus 102 by using RTP.

In addition, as in the first embodiment, it suffices to designate a plurality of sequences as the transmission sources of content data following the start data of the content in the temporary content data storage unit 117. This operation can be implemented by extending the content of "DataEntryUrlBox" to, for example, "DataEntryUrlBox2" shown in FIG. 3 so as to further have entries corresponding to the number of sequences.

FIG. 6 is a view exemplifying the storage location of data which is set for each of a plurality of sequences. In this case, the number of elements (entries) set for each sequence is two. In entry 1 for each sequence, file start.mp4 on a local disk as the same storage destination is designated. In entry 2, content data file content.mp4 in each of different transmission server apparatuses 1, 2, and 3 is designated. This arrangement allows the reproducing apparatus 102 to select, for example, the transmission server apparatus 101 in an optimal communication environment and receive transmitted data upon completion of the reproduction of the content data on the local disk.

In this embodiment, it suffices to designate a content transmission source using RTP in the second entry. When designating the URL of the transmission server apparatus 101 in connection destination information "location", the reproducing apparatus 102 need not designate a duration (time) or file offset because it performs transmission by using RTP. For this reason, there is no need to designate connection duration information "duration" or connection position correction information "offset_delta". Setting a flag for identifying an entry for the transmission of content data using RTP in "DataEntryUrlBox2" allows a content data analysis unit 116 to identify the entry for the transmission of content data by using RTP.

If there is one transmission source of content data, a combination of "Data Reference Box" and "DataEntryUrlBox" as standard BOXes in the MP4 file format and a similar arrangement can indicate the storage destination of content data. If there are a plurality of storage destinations of content data, extending to "DataEntryUrlBox2" shown in the first embodiment allows the reproducing apparatus 102 to receive content data upon switching transmission sources as needed.

This embodiment can shorten the time required for the start of reproduction of moving image data.

According to this embodiment, storing the content data of the start portion on the local disk of the reproducing apparatus in performing reproduction processing makes it possible to start reproduction processing without requiring any wait time for the acquisition of data.

If there are a plurality of transmission server apparatuses from which content data can be acquired, selecting a transmission server apparatus in a better communication environment and acquiring encoded data therefrom can perform stabler reproduction processing.

Even when switching the acquisition destination of data from a local disk to a transmission server apparatus or from a transmission server apparatus to another transmission server apparatus, this embodiment can perform reproduction processing without any pause by performing look-ahead processing for data.

Third Embodiment

Figure 7:
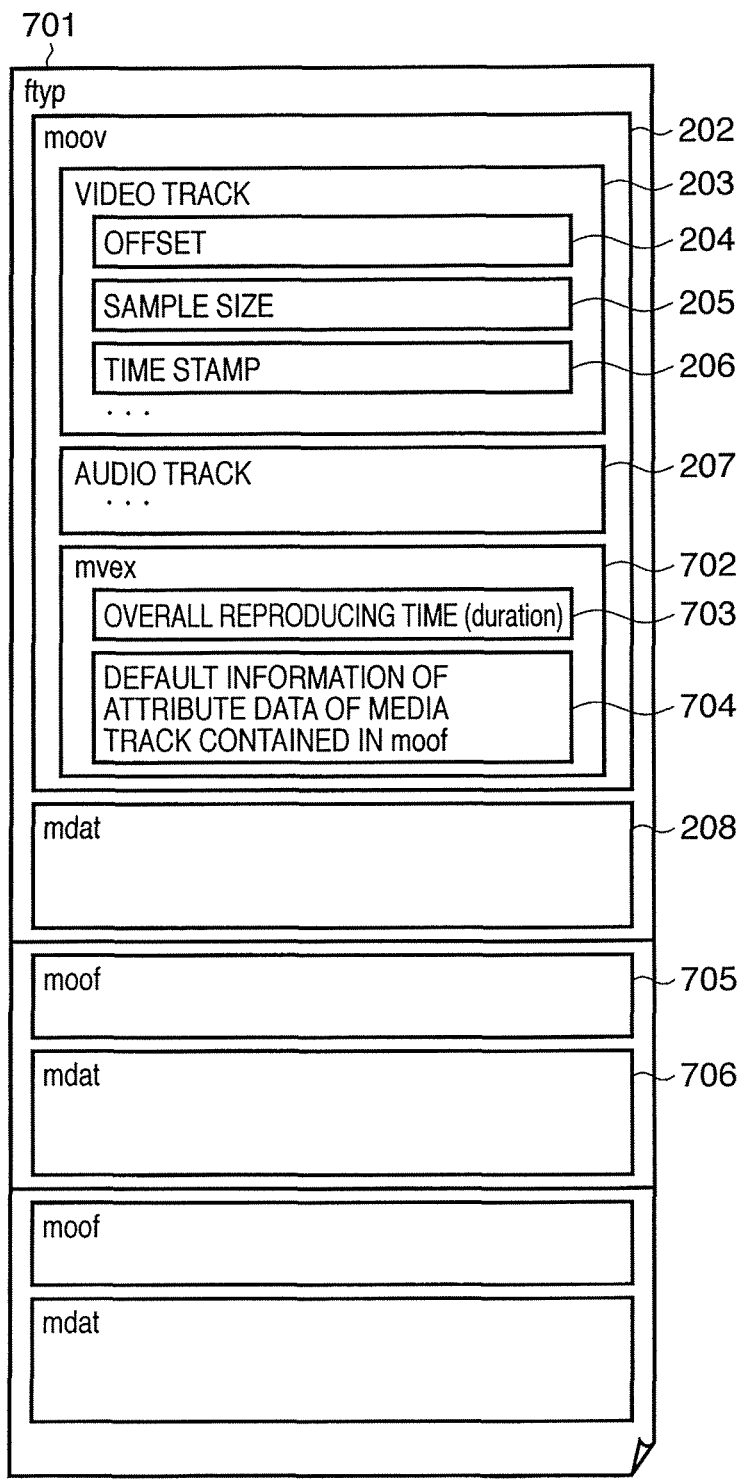
FIG. 7 is a view for explaining the data structure of an MP4 file in the MovieFragment format.

The third embodiment of the present invention will be described next, in which the content data stored in advance on the reproducing apparatus 102 side has the MovieFragment format as one of the MP4 file formats. FIG. 7 is a view for explaining the data structure of an MP4 file in the MovieFragment format. An MP4 file 701 in the MovieFragment format has the same arrangement as that of the MP4 file 201 shown in FIG. 2 except that (mvex) 702, (moof) 705, and (mdat) 706 are added.

In this case, (mvex) 702 is information indicating the information of an extension portion in the MovieFragment format. In addition, "Movie_Fragment_BOX" (moof) 705 and "Media_Data_BOX" (mdat) 706 are a pair of content data portions. The MP4 file 701 in the MovieFragment format allows the header information of a content and content data to be divided on an arbitrary time unit basis. The divided "fragments" can be recorded starting from the start portion of the file in chronological order. In (moov) 202 at the head, which includes the attribute information of the overall content, information associated with the data contained in (mdat) 208 is held, and (mvex) 702 storing information such as the reproduction time of the overall content including a fragment portion is placed.

In this case, (mdat) denoted by reference numeral 208 indicates "Media_Data_BOX", and (mvex) denoted by reference numeral 702 indicates "Movie_Extends_BOX".

"Movie_Fragment_BOX" (moof) 705 appearing next is the header information of the fragment portion, and holds information associated with the data contained in "Media_Data_BOX" (mdat) 706. Combinations of "Movie_Fragment_BOX" (moof) 705 and "Media_Data_BOX" (mdat) 706 are subsequently added to the above arrangement in the same manner.

The MP4 file in the MovieFragment format includes "Movie_Extends_BOX" (mvex) 702 storing extension information in the MovieFragment format in the "Movie_BOX" (moov) 202, as described above. The data contained in (mvex) 702 includes default information 704 such as the sample size of content data contained in the fragment portion and a reproduction time for each sample, in addition to a reproduction time (duration) 703 of the entire movie.

Setting a default value in (mvex) 702 makes it possible to omit the setting of a value for each sample when a default value is used as sample information in "Movie_Fragment_BOX" (moof) 705 following (mvex) 702. As described above, the MovieFragment format allows to form a file structure by concatenating a plurality of blocks in chronological order, with each block including meta data and content data corresponding thereto.

The third embodiment of the present invention which uses an MP4 file in the MovieFragment format will be described next. Assume that as in the first and second embodiments, the reproducing apparatus 102 side stores in advance, in a temporary content data storage unit 117, the data of the start portion of the content data to be reproduced. Assume that a transmission server apparatus 101 on the network transmits content data following the content data of the start portion. At this time, the content data stored in advance on the reproducing apparatus 102 side includes (moov) 202 as the header portion of the head, (mdat) 208 corresponding thereto, and information which designates the storage destinations of the subsequent content data.

More specifically, for example, a BOX indicating the URL of (moof) 705 following (mvex) 702 is added to (mvex) 702. The added BOX in this case has an arrangement similar to that of "MoofReferenceBox" (mref) 801, as shown in FIG. 8. "MoofReferenceBox" (mref) 801 is a BOX which is uniquely defined to implement this embodiment. In this case, "entry_count" 802 of (mref) 801 indicates the number of content data divided with a combination of (moof) 705 and "Media_Data_BOX" (mdat) 706 corresponding thereto being the minimum unit. In addition, connection destination information "location" 803 indicates URL information at which (i)th "Movie_Fragment_BOX" of "entry_count" exists. Furthermore, "size" 804 indicates size information of all consecutive data (moof) 705 stored at the URL in addition to (mdat) 706 corresponding thereto. At the URL indicated by connection destination information "location" 803, (moof) 705 and (mdat) 706 corresponding thereto exist in a continuous form in terms of a file system.

That is, in brief, the content of "MoofReferenceBox" has a data arrangement including URL information and size (byte) information, as shown in FIG. 9.

When starting reproduction processing of the content having a unique BOX shown in FIG. 8, the reproducing apparatus 102 performs reproduction processing of (moov) 202 of the start portion and "Media_Data_BOX" 208 corresponding thereto in the same manner as for the MP4 file in the MovieFragment format. Subsequently, the reproducing apparatus 102 performs reproduction processing of "Movie_Fragment_BOX" 705 connected by the URL information of "MoofReferenceBox" 801 and "Media_Data_BOX" 706 corresponding thereto.

Note that the content data of the start portion stored in the reproducing apparatus 102 in advance may include not only (moov) 202 of the start portion and (mdat) 208 corresponding thereto but also (moof) 705 and (mdat) 706 corresponding thereto as consecutive data.

This embodiment can shorten the time required for the start of reproduction of moving image data.

According to this embodiment, storing the encoded data of the start portion of content data on the local disk of the reproducing apparatus in performing reproduction processing makes it possible to start reproduction processing without any wait time for the acquisition of data.

If there are a plurality of transmission server apparatuses which can acquire encoded data, selecting a transmission server apparatus in a better communication environment and acquiring encoded data can perform stabler reproduction processing.

Even when switching the acquisition destination of data from a local disk to a transmission server apparatus or from a transmission server apparatus to another transmission server apparatus, this embodiment can perform reproduction processing without any pause by performing look-ahead processing for data.

Other Embodiment

As is apparent, the object of the present invention can be achieved by supplying a computer-readable storage medium storing the program codes of software for implementing the functions of the above embodiments to a system or an apparatus. In addition, obviously, the object of the present invention can be achieved by causing the computer (CPU or MPU) of the system or the apparatus to read out the program codes from the storage unit and execute them.

In this case, the program codes read out from the storage medium implement the functions of the above embodiments, and the storage medium storing the program codes is a constituent element of the present invention.

As the storage medium for supplying program codes, for example, a flexible disk, hard disk, optical disk, magnetooptical disk, CD-ROM, CD-R, nonvolatile memory card, or ROM can be used.

Obviously, causing the computer to execute readout program codes makes it possible to implement the functions of the above embodiments. In addition, obviously, the present invention incorporates a case wherein the functions of the above embodiments are implemented by causing an OS (operating system) operating on a computer to actually perform part or all of processing on the basis of the instructions of program codes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-117189, filed Apr. 20, 2006, which is hereby incorporated by reference herein in its entirety.

What is claimed is:

1. A moving image reproduction apparatus connected to a server via a network, comprising:

a designating unit configured to designate a moving image file to be reproduced;

a memory configured to store first moving image data of a plurality of frames to be reproduced first in response to designation of the moving image file, and not to store second moving image data of a plurality of frames to be reproduced after reproducing the first moving image data in response to the designation of the moving image file, identification information of the server from which the second moving image data is acquired;

a reading unit configured to read out, in accordance with the designation of the moving image file, the first moving image data, and the identification information of the server from the memory without using the network;

an acquisition unit configured to acquire the second moving image data to be reproduced at a designated reproduction start time from the server via the network in accordance with the identification information read out from the memory by designating a reproduction start time determined by an end time of the first moving image data, during reproducing the first moving image data which has been stored in the memory in advance of the designation-of the moving image file; and a reproduction unit configured to reproduce the first moving image data read out from the memory without using the network, and to reproduce the second moving image data acquired via the network during reproducing the first moving image data.

2. The apparatus according to claim 1, wherein the memory stores a plurality of identification information of servers from which the second moving image data is acquired and the acquisition unit determines one of the servers based on a communication speed with respect to each of the servers through the network.

3. The apparatus according to claim 2, wherein the acquisition unit switches the one of the servers based on a change of the communication speed.

4. The apparatus according to claim 1, wherein the acquisition unit determines a time of start of acquisition of the second moving image data based on a communication speed with the servers.

5. The apparatus according to claim 1, wherein HTTP and RTP are used as communication protocols.

6. The apparatus according to claim 1, wherein the reproduction unit reproduces the first moving image data and the second moving image data in a file format as an ISO Base Media File Format.

7. The apparatus according to claim 1, wherein the memory is a removable medium set to the moving image reproduction apparatus.

8. A moving image reproduction method performed by a moving image reproduction apparatus which is connected to a server via a network and comprises a memory which stores first moving image data of a plurality of frames to be reproduced first in response to designation of a moving image file, and does not store second moving image data of a plurality of frames to be reproduced after reproducing the first moving image data in response to the designation of the moving image file and stores identification information of the server from which the second moving image data is acquired, the method comprising:

a designating step of designating the moving image file to be reproduced;

a reading step of reading out, in accordance with the designation of the moving image file, the first moving image data and the identification information of the server from the memory without using the network;

an acquisition step of acquiring the second moving image data to be reproduced at a designated reproduction start time from the server via the network in accordance with the identification information read out from the memory by designating the reproduction start time determined by an end time of the first moving image data, during reproducing the first moving image data which has been stored in the memory in advance of the designation of the moving image file; and a reproduction step of reproducing the first moving image data read out from the memory without using the network, and reproducing the second moving image data acquired via the network during reproducing the first moving image data.

9. The method according to claim 8, wherein the memory stores a plurality of identification information of servers from which the second moving image data is acquired and one of the servers is determined in the acquisition step based on a communication speed with the servers through the network.

10. The method according to claim 9, wherein in the acquisition step, the one of the servers is switched based on a change of the communication speed.

11. The method according to claim 8, wherein in the acquisition step, a time of start of acquisition of the second moving image data is determined based on a communication speed with the servers.

12. A computer-readable storage medium which stores a program that causes a computer to execute a moving image reproduction method defined in claim 8.

13. A moving image reproduction apparatus connected to a server via a network, comprising:

a designating unit configured to designate a moving image file to be reproduced;

a memory configured to store first moving image data of a plurality of frames to be reproduced first in response to designation of the moving image file, and not to store second moving image data of a plurality of frames to be reproduced after reproducing the first moving image data in response to the designation of the moving image file, and to store identification information of the server from which the second moving image data is acquired;

a reading unit configured to read out, in accordance with the designation of the moving image file, the first moving image data, and the identification information of the server from the memory without using the network;

an acquisition unit configured to acquire the second moving image data, at an acquisition start time, from the server via the network in accordance with the identification information read out from the memory by setting a reproduction start time of the second moving image data corresponding to a reproduction end time of the first moving image data, during reproduction of the first moving image data which has been stored in the memory before designating the moving image file, wherein the acquisition start time is determined based on a communication speed between the acquisition unit and the server, and the reproduction end time of the first moving image data; and a reproduction unit configured to reproduce the first moving image data read out from the memory without using the network, and to reproduce the second moving image data acquired via the network during reproduction of the first moving image data.

14. The apparatus according to claim 13, wherein the memory stores a plurality of identification information of servers from which the second moving image data is acquired and the acquisition unit identifies one of the servers based on a communication speed with respect to each of the servers through the network.

15. A moving image reproduction method performed by a moving image reproduction apparatus which is connected to a server via a network and comprises a memory which stores first moving image data of a plurality of frames to be reproduced first in response to designation of a moving image file, does not store second moving image data of a plurality of frames to be reproduced after reproducing the first moving image data in response to the designation of the moving image file and stores identification information of the server from which the second moving image data is acquired, the method comprising:

designating the moving image file to be reproduced;

reading out, in accordance with the designation of the moving image file, the first moving image data and the identification information of the server from the memory without using the network;

acquiring the second moving image data, at an acquisition start time, from the server via the network in accordance with the identification information read out from the memory by setting a reproduction start time of the second moving image data corresponding to a reproduction end time of the first moving image data, during reproduction of the first moving image data which has been stored in the memory before designating the moving image file, wherein the acquisition start time is determined based on a communication speed between the acquisition unit and the server, and the reproduction end time of the first moving image data; and reproducing the first moving image data read out from the memory without using the network, and reproducing the second moving image data acquired via the network during reproducing the first moving image data.

16. The method according to claim 15, wherein the memory stores a plurality of identification information of servers from which the second moving image data is acquired and one of the servers is determined based on a communication speed with respect to each of the servers through the network.

* * * * *